(12) United States Patent
Nilsson et al.

(10) Patent No.: US 11,616,561 B2
(45) Date of Patent: Mar. 28, 2023

(54) BEAM SELECTION FOR TERMINAL DEVICES IN MU-MIMO OPERATION

(71) Applicant: Telefonaktiebolaget LM Ericsson (publ), Stockholm (SE)

(72) Inventors: Andreas Nilsson, Gothenburg (SE); Sven Petersson, Sävedalen (SE); Niklas Jaldén, Enköping (SE); Martin Johansson, Mölndal (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/434,449

(22) PCT Filed: Feb. 28, 2019

(86) PCT No.: PCT/EP2019/055039
§ 371 (c)(1),
(2) Date: Aug. 27, 2021

(87) PCT Pub. No.: WO2020/173572
PCT Pub. Date: Sep. 3, 2020

(65) Prior Publication Data
US 2022/0149921 A1 May 12, 2022

(51) Int. Cl.
*H04L 1/02* (2006.01)
*H04B 7/06* (2006.01)
(Continued)

(52) U.S. Cl.
CPC .......... *H04B 7/0695* (2013.01); *H04B 7/043* (2013.01); *H04B 7/0452* (2013.01); *H04B 7/0617* (2013.01); *H04L 27/261* (2013.01)

(58) Field of Classification Search
CPC .... H04B 7/0695; H04B 7/088; H04B 17/318; H04B 7/0617; H04L 5/001; H04W 16/28; H04W 72/02
(Continued)

(56) References Cited

U.S. PATENT DOCUMENTS

2015/0282122 A1 10/2015 Kim
2018/0006696 A1 1/2018 Yue et al.
(Continued)

FOREIGN PATENT DOCUMENTS

WO 2018/231111 A1 12/2018

OTHER PUBLICATIONS

International Search Report and Written Opinion issued in International Application No. PCT/EP2019/055039 dated Oct. 22, 2019 (15 pages).
(Continued)

*Primary Examiner* — Khai Tran
(74) *Attorney, Agent, or Firm* — Rothwell, Figg, Ernst & Manbeck, P.C.

(57) ABSTRACT

There is provided mechanisms for beam selection. A method is performed by a network node. The method comprises performing a beam management procedure for at least two terminal devices. During the beam management procedure reference signals are transmitted in a beam sweep as performed in a set of beams. During the beam management procedure, each of the at least two terminal devices reports at least two beams in the set of beams for which the reference signals have been received with highest power. The method comprises selecting which beams to serve the at least two terminal devices based jointly on the reports and a mutual interference criterion for the at least two terminal devices.

19 Claims, 8 Drawing Sheets

(51) Int. Cl.
  *H04B 7/0426* (2017.01)
  *H04B 7/0452* (2017.01)
  *H04L 27/26* (2006.01)
(58) Field of Classification Search
  USPC .................................... 375/267, 260, 262
  See application file for complete search history.

(56) References Cited

U.S. PATENT DOCUMENTS

| | | | |
|---|---|---|---|
| 2020/0127710 A1* | 4/2020 | Athley | H04B 7/0452 |
| 2021/0315047 A1* | 10/2021 | Reial | H04L 5/0007 |
| 2022/0061087 A1* | 2/2022 | Koskela | H04W 72/02 |
| 2022/0070053 A1* | 3/2022 | Matsumura | H04W 76/19 |
| 2022/0182115 A1* | 6/2022 | Choi | H04B 7/0691 |

OTHER PUBLICATIONS

Ericsson, "Explicit versus implicit feedback for advanced CSI reporting", 3GPP TSG-RAN WG1#86, R1-167643, Gothenburg, Sweden, Aug. 22-26, 2016 (11 pages).

* cited by examiner

BEAM SELECTION FOR TERMINAL DEVICES IN MU-MIMO OPERATION

CROSS REFERENCE TO RELATED APPLICATION

This application is a 35 U.S.C. § 371 National Stage of International Patent Application No. PCT/EP2019/055039, filed Feb. 28, 2019.

TECHNICAL FIELD

Embodiments presented herein relate to a method, a network node, a computer program, and a computer program product for beam selection.

BACKGROUND

In communication networks, there may be a challenge to obtain good performance and capacity for a given communications protocol, its parameters and the physical environment in which the communication network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a network node or its transmission and reception point, TRP) and at the terminal-end (as represented by a terminal device), which typically is referred to as a beam pair link (BPL). One task of the beam management procedure is to discover and maintain beam pair links. A BPL (i.e. both the beam used by the network node and the beam used by the terminal device) is expected to be discovered and monitored by the network using measurements on downlink reference signals, such as channel state information reference signals (CSI-RS) or synchronization signal block (SSB) signals, used for beam management.

The CSI-RS for beam management can be transmitted periodically, semi-persistently or aperiodically (event triggered) and they can be either shared between multiple terminal devices or be device-specific. The SSB are transmitted periodically and are shared for all terminal devices. In order for the terminal device to find a suitable network node beam, the network node transmits the reference signal in different transmission (TX) beams on which the terminal device performs measurements, such as reference signal received power (RSRP), and reports back the M best TX beams (where M can be configured by the network). Furthermore, the transmission of the reference signal on a given TX beam can be repeated to allow the terminal device to evaluate a suitable reception (RX) beam.

One purpose of multi-user multiple input multiple output (MU-MIMO) communication is for a TRP to simultaneously serve multiple terminal devices in the same time, frequency, and code resource and in this way increase the capacity of the communication system. If the TRP has multiple antenna panels it can perform MU-MIMO transmission by, e.g., transmitting to one terminal device from each panel or by applying different precoders across panels to different terminal devices and thereby transmitting to different terminal devices from one and the same antenna panel. To achieve significant capacity gains with MU-MIMO, low interference between co-scheduled terminal devices should be ensured. This can be achieved by making accurate channel state information (CSI) available at the TRP to facilitate interference nulling in the precoding, and/or by co-scheduling terminal devices that have close to orthogonal radio propagation channels. An example of the latter is if two terminal devices are in line-of-sight and have an angular separation larger than the beamwidth of an antenna panel. In this case, the two terminal devices can be co-scheduled by the TRP transmitting with a beam directed to the first terminal device from one antenna panel and transmitting with a beam directed to the second terminal device from another antenna panel.

At mmW frequencies the cells as spanned by the TRPs are assumed to be rather small due to poor propagation properties and it is therefore expected that the probability of having a line of sight (LOS) path towards the terminal device is high. For LOS conditions the angular spread is typically small, which is beneficial for MU-MIMO performance.

Antenna panels fed by an analog distribution network (resulting in analog beamforming) might typically be configured with a set of predefined beams, for example by a so called grid of beams (GoB). Beams in the GoB are then used during the beam management procedure. The GoB could be based on beam weights in the form of Discrete Fourier Transform (DFT) vectors (i.e. linear phase fronts with no amplitude taper). In order to reduce straddling losses between the beams, an oversampling factor of, for example, 2 can be used. Also, oversampling of codebooks for digital beamforming at the TRP can be achieved by having multiple set of DFT vectors that are shifted a certain number of degrees relative each other. However, due to side-lobes from the beams based on DFT vectors, the isolation between the two beams for the two co-scheduled terminal devices is not optimal.

Hence, there is still a need for improved beamforming.

SUMMARY

An object of embodiments herein is to enable efficient beam selection that does not result in the issues noted above, or at least where the above noted issues a mitigated or reduced.

According to a first aspect there is presented a method for beam selection. The method is performed by a network node. The method comprises performing a beam management procedure for at least two terminal devices. During the beam management procedure reference signals are transmitted in a beam sweep as performed in a set of beams. During the beam management procedure, each of the at least two terminal devices reports at least two beams in the set of beams for which the reference signals have been received with highest power. The method comprises selecting which beams to serve the at least two terminal devices based jointly on the reports and a mutual interference criterion for the at least two terminal devices.

According to a second aspect there is presented a network node for beam selection. The network node comprises processing circuitry. The processing circuitry is configured to cause the network node to perform a beam management procedure for at least two terminal devices. During the beam management procedure reference signals are transmitted in a beam sweep as performed in a set of beams. During the beam management procedure, each of the at least two terminal devices reports at least two beams in the set of beams for which the reference signals have been received with highest power. The processing circuitry is configured to cause the network node to select which beams to serve the at least two terminal devices based jointly on the reports and a mutual interference criterion for the at least two terminal devices.

According to a third aspect there is presented a network node for beam selection. The network node comprises a beam management module configured to perform a beam management procedure for at least two terminal devices. During the beam management procedure reference signals are transmitted in a beam sweep as performed in a set of beams. During the beam management procedure, each of the at least two terminal devices reports at least two beams in the set of beams for which the reference signals have been received with highest power. The network node comprises a select module configured to select which beams to serve the at least two terminal devices based jointly on the reports and a mutual interference criterion for the at least two terminal devices.

Advantageously this enables efficient beam selection.

Advantageously this beam selection does not result in the issues noted above.

Advantageously this beam selection in turn enables improved beamforming.

Advantageously this beam selection can be used to improve the isolation between the transmission to two (or more) terminal devices scheduled for MU-MIMO for mmW systems, which will improve the overall system performance.

According to a fourth aspect there is presented a computer program for beam selection, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise.

The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
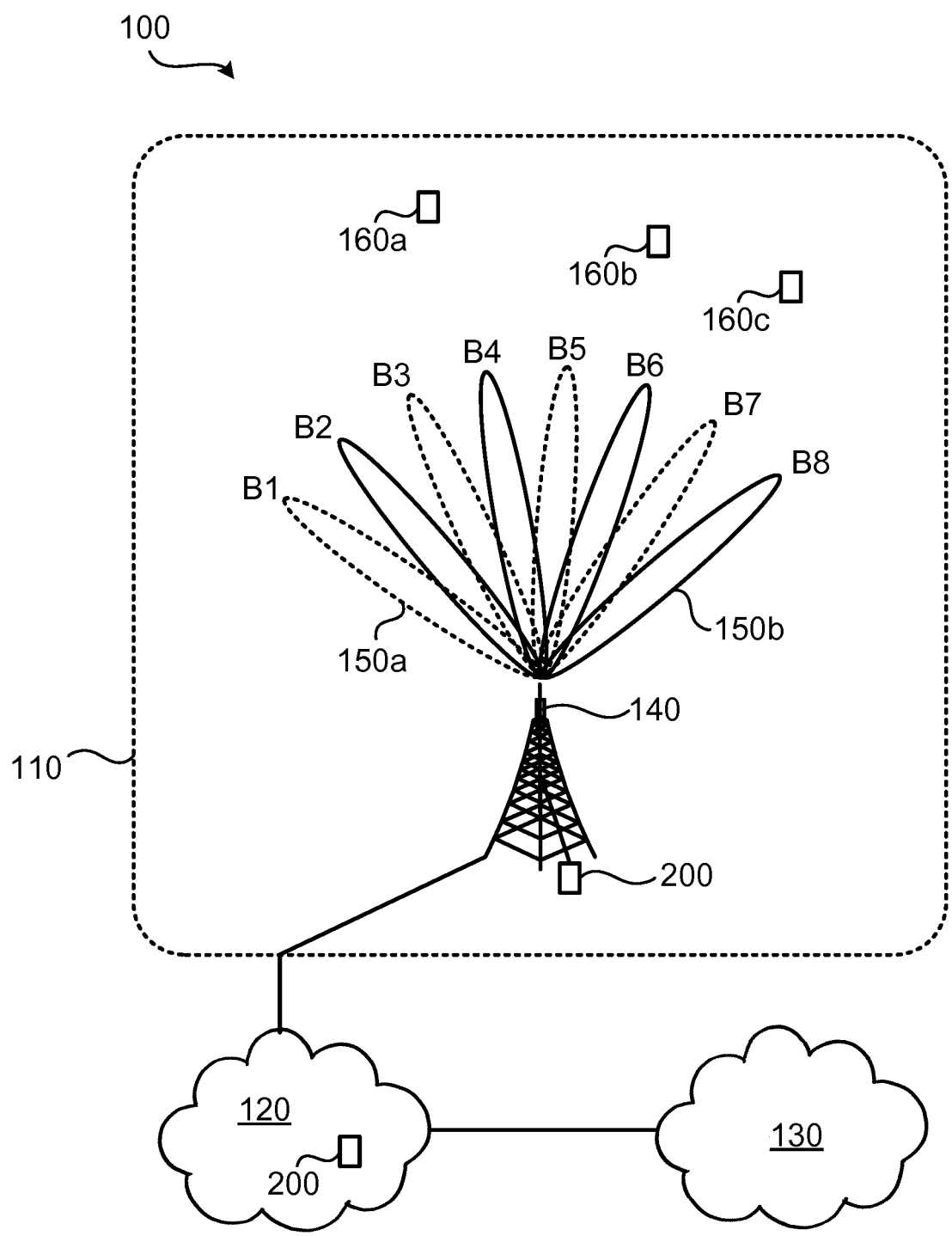
FIG. 1 is a schematic diagram illustrating a communication network according to embodiments.

FIG. 1 is a schematic diagram illustrating a communication network 100 where embodiments presented herein can be applied. The communication network 100 comprises a radio access network node 140 configured to provide network access over one or more radio propagation channels to terminal device 160a, 160b, 160c in a radio access network 110. Non-limited examples of terminal devices 160a:160c are portable wireless devices, mobile stations, mobile phones, handsets, wireless local loop phones, user equipment (UE), smartphones, laptop computers, tablet computers, network equipped sensors, network equipped vehicles, and Internet of Things (IoT) devices. The radio access network node 140 is controlled by a network node 200. In some embodiments the radio access network node 140 and/or the network node 200 is part of, integrated with, or collocated with a radio base station, base transceiver station, node B, evolved node B, gNB, access point, TRP, or the like. The radio access network 110 is operatively connected to a core network 120. The core network 120 is in turn operatively connected to a packet data network 130, such as the Internet. The terminal devices 160a:160c are thereby, via the radio access network node 140, enabled to access services of, and exchange data with, the service network 130.

The network node 200, via the radio access network node 14o, communicates with the terminal devices 160a:160c in beams B1, B2, B3, B4, B5, B6, B7, and B8. The beams B1:B8 could either be used only for transmission from the network node 200 towards the terminal devices 160a:160c or for both transmission from the network node 200 towards the terminal devices 160a:160c and reception by the network node 200 from the terminal devices 160a:160c. That is, the beams B1:B8 could on the one hand be only TRP TX beams or on the other hand be both TRP TX beams and TRP RX beams. A beam management procedure is performed in order for the network node 200 to select which beam to use for communication with each of the terminal devices 160a:160c. As noted above, there is a need for improved beamforming.

In the example of FIG. 1 the network node 200 has 8 beams (B1:B8) generated from two different subsets (where beams B1, B3, B5, and B7 belong to one subset and beams B2, B4, B6, B8 belong to another subset) to select from. According to state of the art, the network node 200 would select the beam for each respective terminal device 160a, 160b, 160c based only on highest reported received power, as reported during the beam management procedure. Assume now that the network node 200 has configured the terminal devices 160a:160c to each report the two beams with highest received power during the beam management procedure. In the illustrative example of FIG. 1, that would be beams B3 and B4 for terminal device 160, beams B5 and B6 for terminal device 160l3, and beams B6 and B7 for terminal device 160c. According to some of the herein disclosed embodiments, instead of selecting the beams for the terminal devices 160a:160c purely based on highest received power (say, beam B3 for terminal device 160a, beam B6 for terminal device 160b, and beam B7 for terminal device 160c), the network node 200 selects the beams from the same subset that together has the highest received power. In this example either beams B3, B5 and B7 are selected, or beams B4 and B6 are selected (depending on if the sum of the received power values for beams B3, B5 and B7 is smaller or larger than the sum of the received power values for beams B4 and B6), assuming that beam B6 could server both terminal device 160b and terminal device 160c. Otherwise, terminal device 160c might be paired with another terminal device.

The embodiments disclosed herein thus relate to mechanisms for beam selection. In order to obtain such mechanisms there is provided a network node 200, a method performed by the network node 200, a computer program product comprising code, for example in the form of a computer program, that when run on a network node 200, causes the network node 200 to perform the method.

Figure 2:
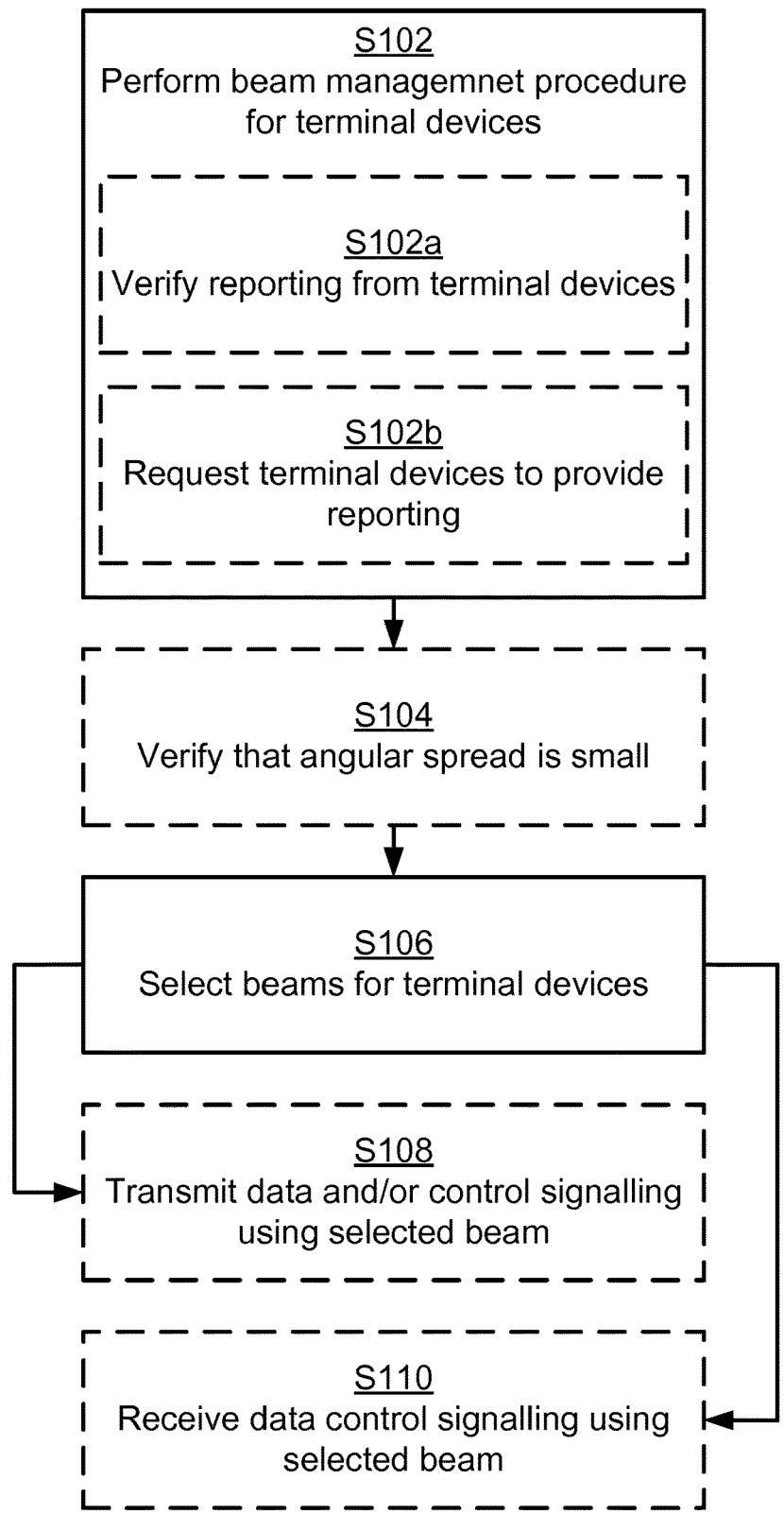
FIG. 2 is a flowchart of methods according to embodiments.

FIG. 2 is a flowchart illustrating embodiments of methods for beam selection. The methods are performed by the network node 200. The methods are advantageously provided as computer programs 920.

S102: The network node 200 performs a beam management procedure for at least two terminal devices 160a:160c.

During the beam management procedure, reference signals are transmitted in a beam sweep as performed in a set of beams B1:B8.

During the beam management procedure, each of the at least two terminal devices 160a:160c reports at least two beams in the set of beams B1:B8 for which the reference signals have been received with highest power.

The beams for the terminal devices 160a:160c are then selected not only based on the reports of highest power but also on interference.

S106: The network node 200 selects which beams to serve the at least two terminal devices 160a:160c based jointly on the reports and a mutual interference criterion for the at least two terminal devices 160a:160c.

Thereby, when applying MU-MIMO for two (or more) terminal devices 160a:160c in a mmW system with analog antenna panels, instead of only selecting the beam for each terminal device 160a:160c based on highest received power, the network node 200 selects the beams for the terminal devices 160a:160c based on a combination of high received power and good isolation, as given by the mutual interference criterion, between the two beams in order to maximize the intra-cell SIR.

Embodiments relating to further details of beam selection as performed by the network node 200 will now be disclosed.

There could be different types of beams. According to an embodiment, the beams are DFT beams. In other words, the beams are based on beam weights in the form of DFT vectors. In some aspects the beams are based on oversampled precoders. In particular, according to an embodiment, the precoders are oversampled a factor 2·k, where k=1 or k=2. Additionally, or alternatively, the beams might be generated using analog beamforming.

There could be different types of reference signals. According to an embodiment, the each of the reference signals is a channel state information reference signal (CSI-RS).

There could be different way for the terminal devices 160a:160c to report the at least two beams in the set of beams B1:B8 for which the reference signals have been received with highest power. According to an embodiment, the beams are reported in terms of CSI-RS Resource Indicators (CRIs).

There may be different ways to select the beams in step S106. Different embodiments relating thereto will now be described in turn.

One efficient way of increasing the isolation between the beams to be selected for the at least two terminal devices 160a:160c is to select a different beam for each terminal device 160a:160c from the same set of orthogonal beams. Each beam in the set will have a null in the pointing direction of all other beams in the set. Particularly, according to an embodiment, the mutual interference criterion is defined in terms of orthogonality between the beams selected to serve the at least two terminal devices 160a:160c.

The mutual interference criterion might then be to select the beams so as to minimize the mutual interference by maximizing the orthogonality. In particular, according to an embodiment, the beams in the set of beams B1:B8 are generated from a set of precoders. The precoders are divided into at least two subsets where all beams generated from the precoders within each subset are orthogonal to each other. The beams to serve at least two of the at least two terminal devices 160a:160c are then selected from the same subset. In the illustrative examples of FIG. 1, beams B1, B3, B5, and B7 belong to one subset and beams B2, B4, B6, and B8 belong to another subset. In this respect, that the precoders are orthogonal to each other means that they are orthogonal within a tolerance or correspond to the minimum absolute value of the inner product between the precoders. That is, the at least two subsets could be selected such as the inner product of any precoders within each subset is minimized. In general term, one non-limiting way to create two subsets of beams fulfilling these properties involves the following. First, one set of K beams is designed. The set of K beams could be defined by a set of DFT beams, or a set of oversampled DFT beams, or any other type of beams. The beams in the set of K beams are sorted in L subsets such that the inner product of any two precoders within the same subset is minimized.

There could be different ways to divide the precoders, or beams, into the at least two subsets. In some aspects the beams generated from the precoders within different subsets are interleaved with respect to each other. This is the case in the illustrative example of FIG. 1. In particular, according to an embodiment, beams generated from precoders in different subsets are interleaved with each other in terms of pointing directions such that any two beams with adjacent pointing directions are generated from precoders belonging to different subsets.

There could be different ways of determining from which subset the beams for the terminal device 160a:160c are to be selected. In some aspects the beams are selected from that subset which yields the maximum sum of the reported received power for the terminal devices 160a:160c. In particular, according to an embodiment, the beams for the at least two of the at least two terminal devices 160a:160c are selected from that subset for which the sum of received power in decibel (dB) for the at least two of the at least two terminal devices 160a:160c is highest. One alternative is to consider the sum of the received power in the power domain instead of in the logarithmic domain (i.e., to have measurements in Watt instead of decibel). Another alternative is to select the beams for which the lowest received power to any served terminal device 160a:160c is highest.

In some aspects the beams are based on oversampled precoders. In particular, according to an embodiment, the precoders are oversampled a factor 2·k, where k=1 or k=2, to form 2·k subsets such that all beams generated from the precoders within each subset are orthogonal to each other.

In some aspects the network node 200 verifies that one or more conditions are fulfilled before selecting the beams in step S106.

In some aspects the network node 200 checks that the terminal devices 160a:160c are reporting one strongest beam per subset. Particularly, according to an embodiment, the network node 200 is configured to perform (optional) step S102a as part of the beam management procedure in step S102:

S102a: The network node 200 verifies that the at least two of the at least two terminal devices 160a:160c each has reported beams generated from at least one same subset or two same subsets before selecting which beams to serve the at least two terminal devices 160a:160c.

In order for the network node 200 to avoid having to perform step S102a, in some aspects the network node 200 configures the terminal devices 160a:160c to report beams generated from at least two of the subsets. That is, according to an embodiment, the network node 200 is configured to perform (optional) step S102b as part of the beam management procedure in step S102:

S102b: The network node 200 requests the at least two terminal devices 160a:160c to report beams generated from at least two of the at least two subsets before transmitting the reference signals.

As an alternative to performing step S102b the network node 200 might perform a beam sweep procedure comprising multiple beam sweeps, such that one beam sweep is made in each of the at least two subsets per, and where the terminal devices 160a:160c report one best beam per beam sweep, and thus one best beam per subset.

In some aspects the network node 200 evaluates the typical angular spread in different directions (for example by analyzing the receive correlation in separate beams). Particularly, according to an embodiment, the reference signals are transmitted over a radio propagation channel, and the network node 200 is configured to perform (optional) step S104:

S104: The network node 200 verifies that angular spread of the radio propagation channel is smaller than a threshold value before selecting which beams to serve the at least two terminal devices 160a:160c.

In directions where the angular spread is larger than the threshold value, the network node may limit the strict choice of beams from different beam sets, and instead selects beams based only on highest reported received power.

In some aspects the selected beams are used for transmission of data and/or control signalling. That is, according to an embodiment, the network node 200 is configured to perform (optional) step S108:

S108: The network node 200 transmits data and/or control signalling towards one of the terminal devices 160a:160c using the selected beam for that terminal device 160a:160c.

In some aspects the selected beams are used for reception of data and/or control signalling. That is, according to an embodiment, the network node 200 is configured to perform (optional) step S110:

S110: The network node 200 receives data from one of the terminal devices 160a:160c using the selected beam for that terminal device 160a:160c.

Hence, in this case the same beams can be used by the network node 200 for both transmission and reception.

In some aspects the same principles can be applied also for two-dimensional beamforming, and thus for beam selection in two dimensions. Hence, according to an embodiment, the beams sweep is performed in both azimuth and elevation. In more detail, if the reported beams from the terminal devices 160a:160c differ in both vertical and horizontal dimension, a beam for each respective terminal device 160a:160c might be selected such that the beams point in different directions both in the vertical and horizontal dimension (as long as the values of received power are still high enough these beams.

In view of the above, if the beamforming weight (defined as a matrix) is found via the Kronecker product of two vectors (one column vector and one row vector), then the inner product of two vectorized beamforming weights (all elements included) is the same as the product of the inner products of the column vector and the row vector, respectively.

Figure 3:
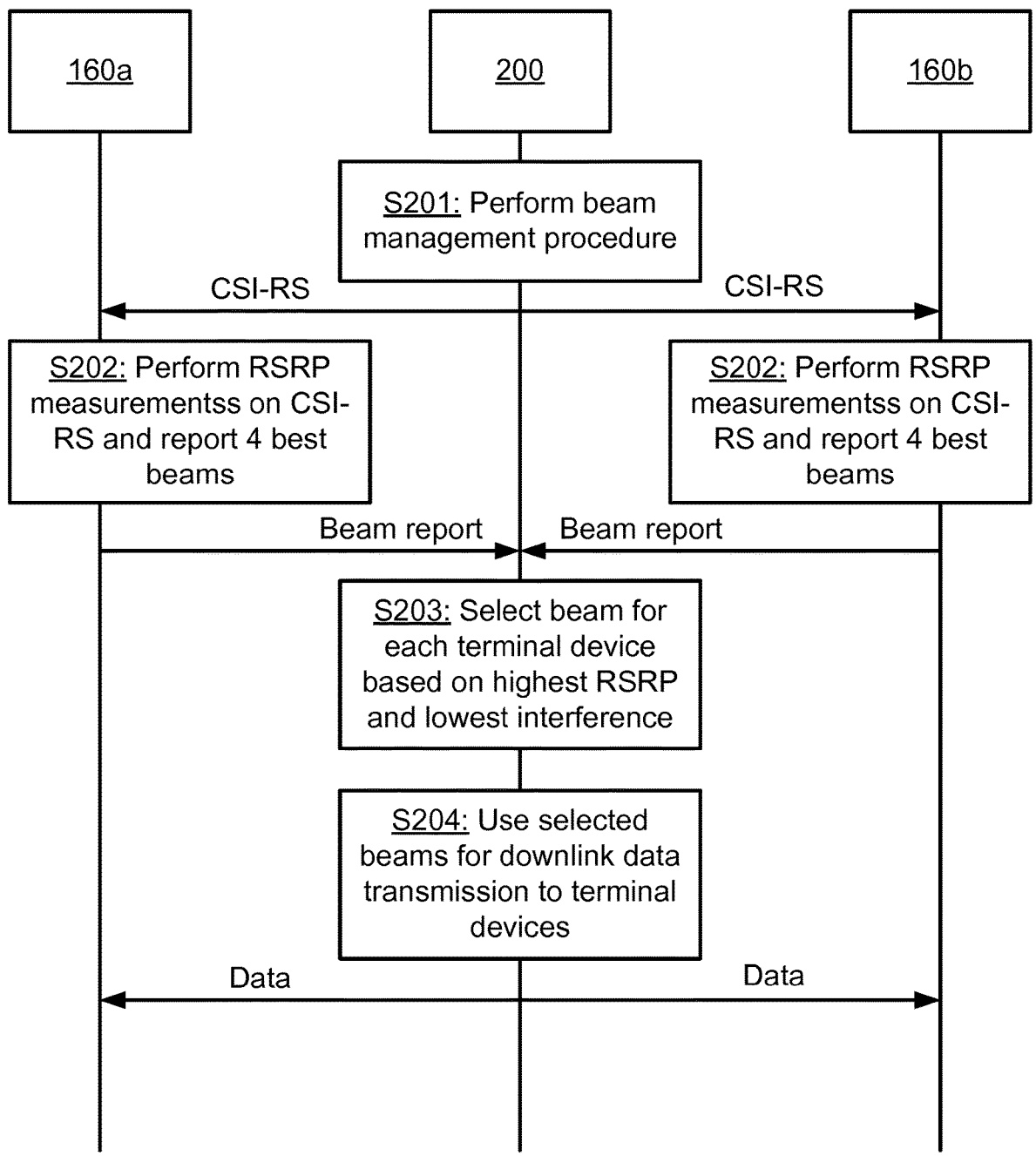
FIG. 3 is a signalling diagram according to an embodiment.

One particular embodiment for beam selection as performed by the network node 200 based on at least some of the above disclosed embodiments will now be disclosed with reference to the signalling diagram of FIG. 3.

S201: The network node 200 performs a beam management procedure to find suitable beams by transmitting CSI-RS in beams. This could for example be a periodic beam management procedure with TRP beams covering the whole cell and shared between all terminal devices 160a, 160b of the cell. Or it can be made out of several more local terminal device specific beam management procedures where each beam management procedure tests a number of beams around the angular direction of each terminal device 160a, 160b.

S202: The terminal devices 160a, 160b receive the CSI-RSs and perform RSRP measurements on them. The terminal devices 160a, 160b are configured to report the four best beams based on RSRP measurements, and therefor provide a beam report identifying the four CSI-RS resource indicators (CRIs) corresponding to the four best beams.

S203: The network node 200 finds the best beam for each respective terminal device 160a, 160b with respect to highest RSRP and lowest interference.

Figure 4:
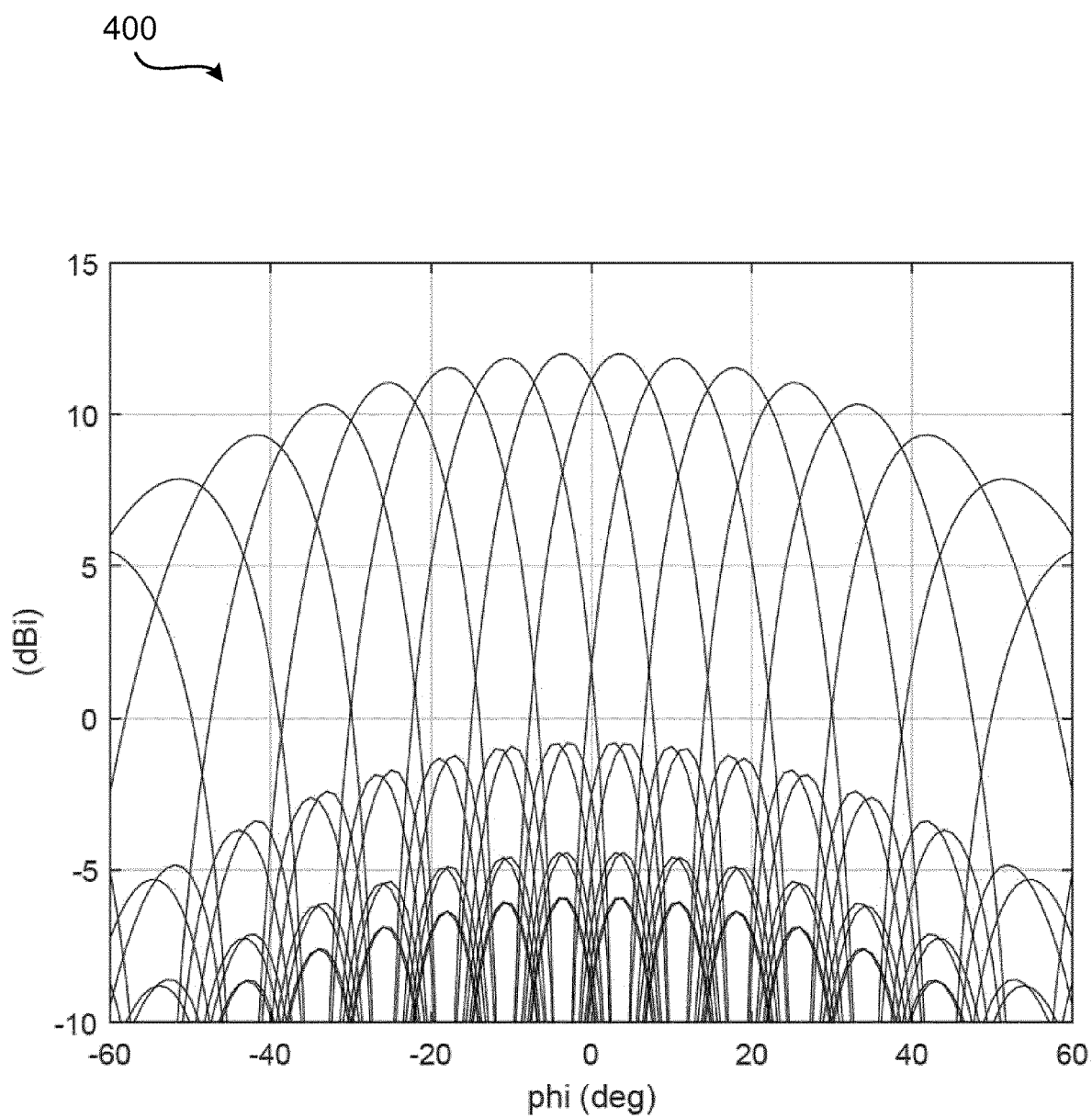
FIG. 4 schematically illustrates a grid of beams according to an embodiment.

S204: The network node 200 uses the selected beams for downlink data transmission to the terminal devices 160a, 160b Simulations have been performed to verify and illustrate the performance gain when using the methods according to the herein disclosed embodiments. In the simulations a network node 200 with 8 horizontal antenna elements, where the antenna elements are separated by 0.5 times the wavelength, and with two times oversampled DFT beams 400, as shown in FIG. 4. Further, a LOS radio propagation channel has been assumed. The LOS radio propagation channel used in simulations might be regarded as any radio propagation channel with small angular spread and not necessarily having LOS.

Figure 5:
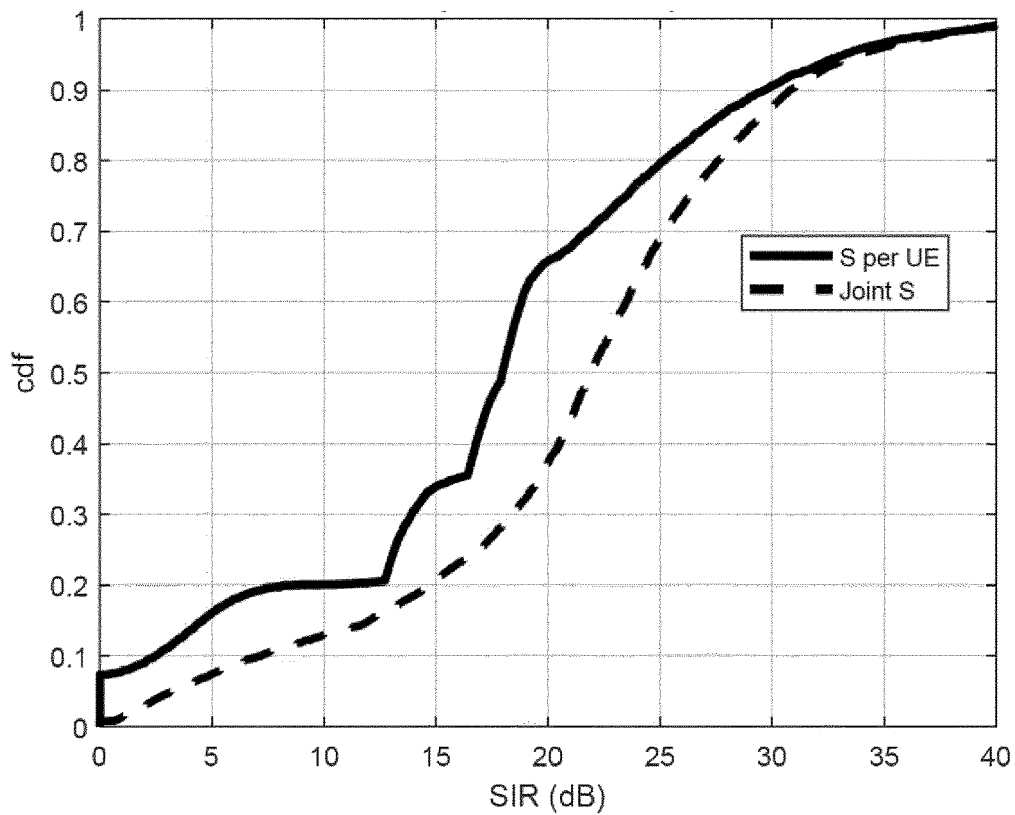
FIGS. 5 and 6 illustrate simulation results according to embodiments.
Figure 6:
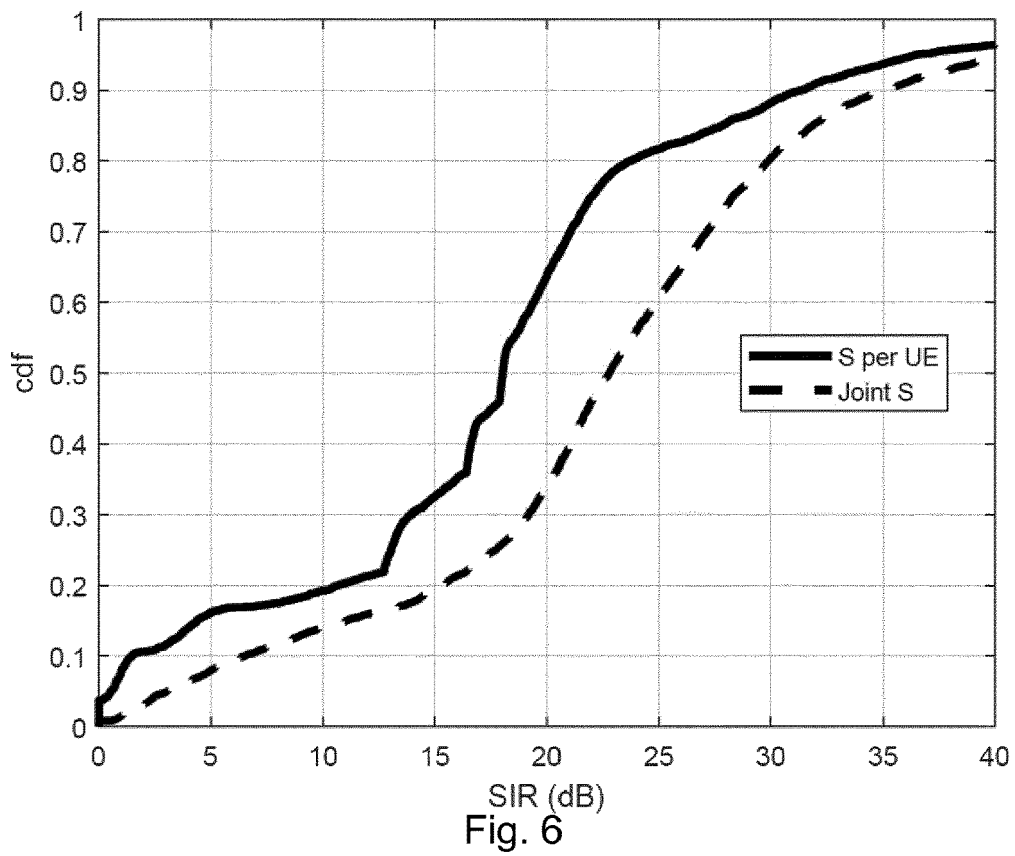

Simulation results are shown in FIG. 5 and FIG. 6 which at solid lines (denoted "S per UE") illustrate the cumulative distribution function as a function of SIR (in dB) for the best beam from the beam grid selected per terminal device 160a:160c only based on RSRP and which at dashed lines (denoted "Joint S") illustrate the cumulative distribution function as a function of SIR (in dB) for the joint selection of beam based on RSRP such that only beams from the same set of DFT beams, i.e. only orthogonal beams, are used. The minimum beam separation is set to zero which means that the terminal devices can be scheduled in the same beam. In FIG. 5 an oversampling factor of 2 is used and in FIG. 6 an oversampling factor of 4 is used.

The criterion for selecting beams per terminal device 160a:160c for the "Joint S" case is the sum power (in dB). Other criteria can be envisioned as well, for example sum mutual information. The intra-cell SIR shown in FIG. 5 and FIG. 6 is for all combinations of terminal device locations where each of two terminal devices are located with uniform distribution within the interval [−60, 60] degrees with respect to the network node 200. As can be seen, the methods according to the herein disclosed embodiments improve the SIR compared to selecting beam per terminal device based on only RSRP. The lower SIR values appear when the terminal devices are closely located with respect to each other. The cases where SIR=0 dB arise from the case where both terminal devices are served by the same beam. This will never occur in practice unless the scheduler in the network node 200 will allow for it.

In summary, according to at least some of the above disclosed embodiments there have been disclosed a method performed at a network node 200 for improved MU-MIMO performance based on simultaneous transmission to at least two terminal devices 160:160c using a codebook-based transmission. The terminal devices 160a:160 are requested to provide measurement reports on at least two of the strongest beams for which the network node 200 select the set of beams such that a good balance between potential loss in signal power and reduced interference is achieved for the scheduled terminal devices 160a:160c. In some examples, the selection of beams is performed for each terminal device 160a:160c from the same set of DFT beams to ensure orthogonality between each beam. In some examples, the impact from not selecting the beams resulting in the highest received signal power is lower than the benefit of the decreased mutual interference. Further, although some examples have been illustrated for a mmW systems, the herein disclosed embodiments are applicable also for lower frequencies.

Figure 7:
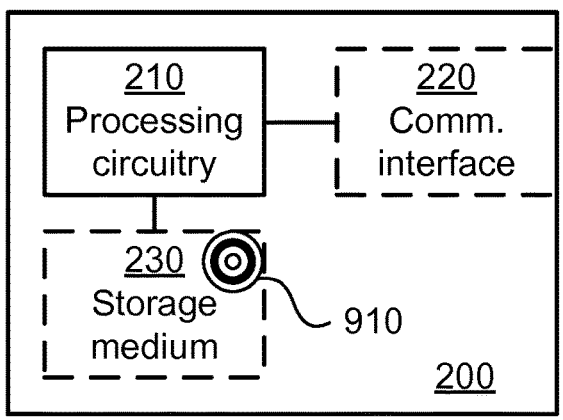
FIG. 7 is a schematic diagram showing functional units of a network node according to an embodiment.

FIG. 7 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, functions, nodes, and devices of the communication network 100. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 8:
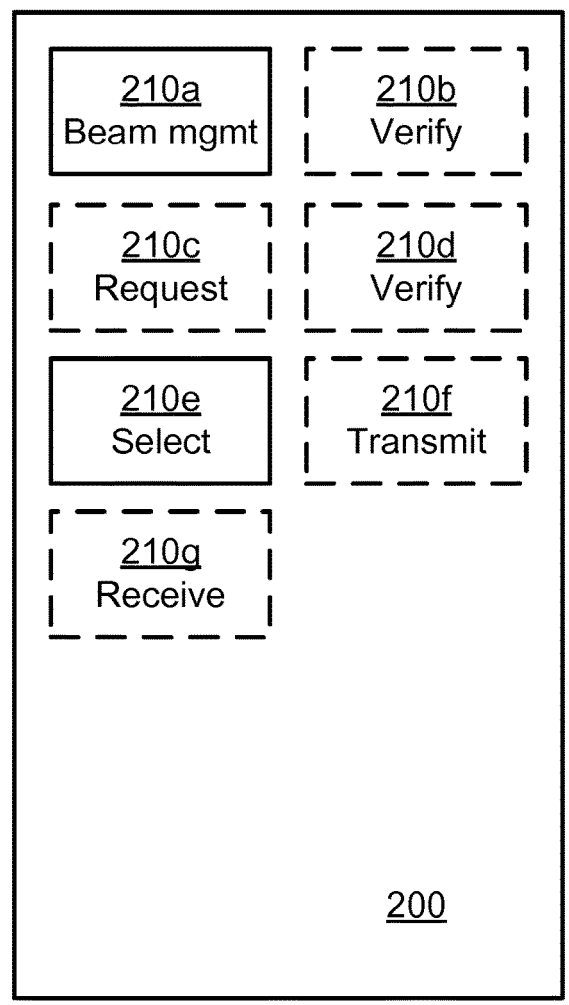
FIG. 8 is a schematic diagram showing functional modules of a network node according to an embodiment.

FIG. 8 schematically illustrates, in terms of a number of functional modules, the components of a network node 200 according to an embodiment. The network node 200 of FIG. 8 comprises a number of functional modules; a beam management module 210a configured to perform step S102, and a select module 210e configured to perform step S102. The network node 200 of FIG. 8 may further comprise a number of optional functional modules, such as any of a verify module 210b configured to perform step S102a, a request module 210c configured to perform step S102b, a verify module 210d configured to perform step S104, a transmit module 210f configured to perform step S108, and a receive module 210g configured to perform step S110. In general terms, each functional module 210a-210g may in one embodiment be implemented only in hardware and in another embodiment with the help of software, i.e., the latter embodiment having computer program instructions stored on the storage medium 230 which when run on the processing circuitry makes the network node 200 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-210g may be implemented by the processing circuitry 210, possibly in cooperation with the communications interface 220 and/or the storage medium 230. The processing circuitry 210 may thus be configured to from the storage medium 230 fetch instructions as provided by a functional module v and to execute these instructions, thereby performing any steps as disclosed herein.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 7 the processing circuitry 210 may be distributed among a plurality of devices, or nodes. The same applies to the functional modules 210a-210g of FIG. 8 and the computer program 920 of FIG. 9.

Figure 9:
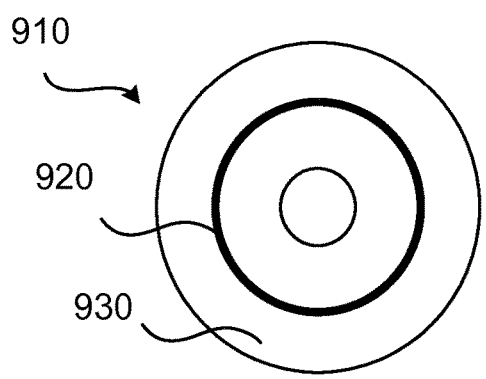
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

Figure 10:
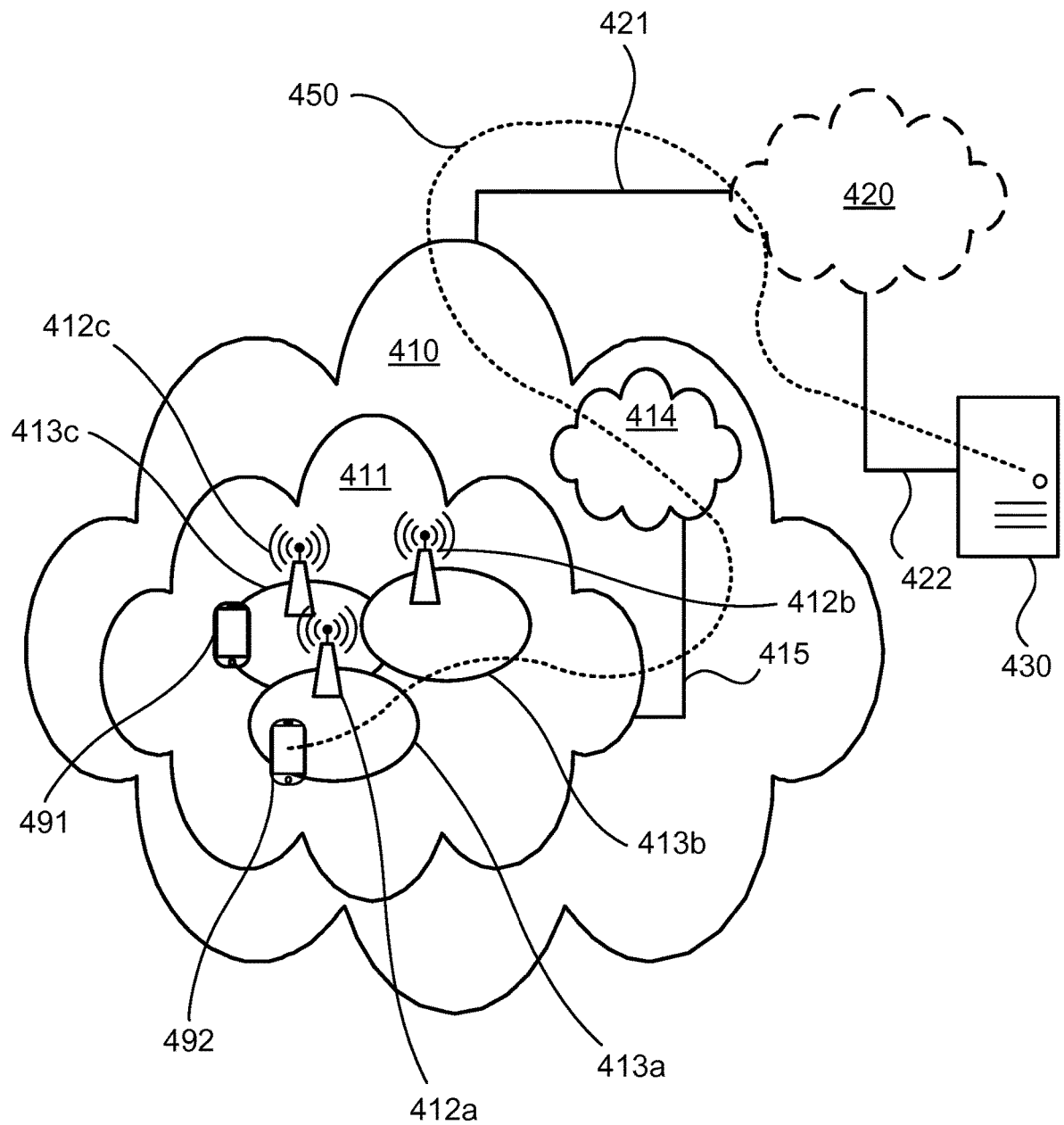
FIG. 10 is a schematic diagram illustrating a telecommunication network connected via an intermediate network to a host computer in accordance with some embodiments.

FIG. 10 is a schematic diagram illustrating a telecommunication network connected via an intermediate network to a host computer in accordance with some embodiments. In accordance with an embodiment, a communication system includes telecommunication network 410, such as a 3GPP-type cellular network, which comprises access network 411, such as radio access network 110 in FIG. 1, and core network 414, such as core network 120 in FIG. 1. Access network 411 comprises a plurality of radio access network nodes 412a, 412b, 412c, such as NBs, eNBs, gNBs (each corresponding to the radio access network node 140 of FIG. 1) or other types of wireless access points, each defining a corresponding coverage area, or cell, 413a, 413b, 413c. Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the terminal devices 160a:160c of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 10 as a whole enables connectivity between the connected UEs 491, 492 and host computer 43o. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 11:
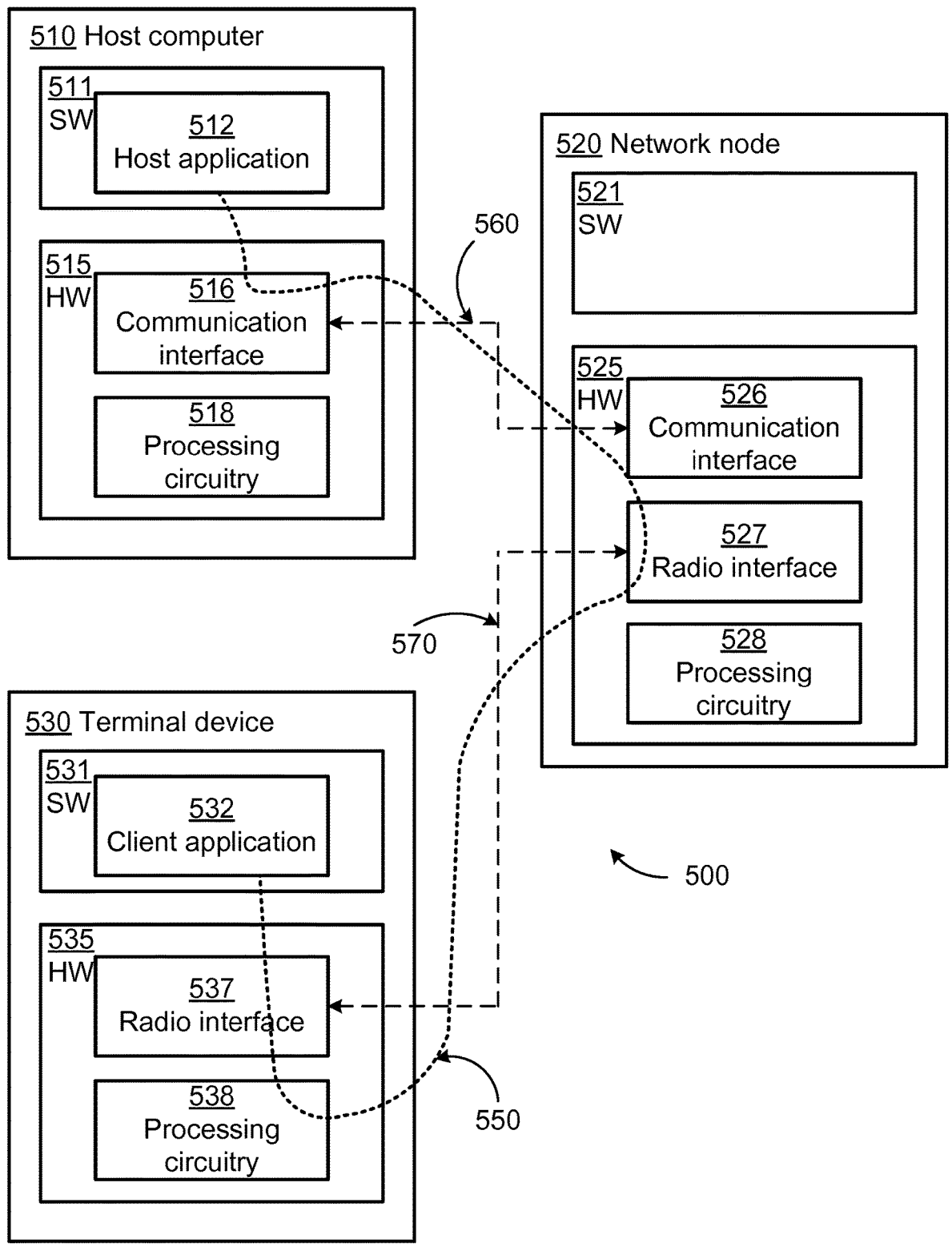
FIG. 11 is a schematic diagram illustrating host computer communicating via a radio base station with a terminal device over a partially wireless connection in accordance with some embodiments.

FIG. 11 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the terminal devices 160a:160c of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the radio access network node 140 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by radio access network node 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 11 may be similar or identical to host computer 430, one of network nodes 412a, 412b, 412c and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for beam selection, the method being performed by a network node, the method comprising:
    performing a beam management procedure for at least a first user equipment (UE) and a second UE, wherein, during the beam management procedure, reference signals are transmitted in a beam sweep as performed in a set of beams comprising a plurality of subsets of beams including a first subset of beams and second subset of beams, wherein the first subset of beams is disjoint with the second subset of beams;

obtaining from the first UE first beam information, the first beam information identifying a first beam included in the first subset of beams and identifying a first beam included in the second subset of beams;

obtaining from the second UE second beam information, the second beam information identifying a second beam included in the first subset of beams and identifying a second beam included in the second subset of beams;

using the first beam information provided by the first UE and the second beam information provided by the second UE to select a subset of beams from the set of beams, wherein the selected subset of beams is the first subset of beams; and as a result of selecting the first subset of beams:
  i) selecting, from the first subset of beams, a first serving beam to serve the first UE based on the first beam information provided by the first UE; and
  ii) selecting, from the first subset of beams, a second serving beam to serve the second UE based on the second beam information provided by the second UE.

2. The method of claim 1, wherein each beam included in the first subset of beams is orthogonal to each other beam included in the first subset of beams.

3. The method claim 1, wherein
the beams in the first subset of beams are generated from a first set of precoders, wherein an inner product of any precoders within the first set is minimized, and
the beams in the second subset of beams are generated from a second set of precoders, wherein an inner product of any precoders within second set is minimized.

4. The method of claim 2, wherein each beam included in the second subset of beams is orthogonal to each other beam included in the second subset of beams.

5. The method of claim 1, wherein using the first beam information provided by the first UE and the second beam information provided by the second UE to select a subset of beams from the set of beams comprises:
using the first beam information provided by the first UE and the second beam information provided by the second UE to compute a first aggregate power value associated with the first subset of beams;
using the first beam information provided by the first UE and the second beam information provided by the second UE to compute a second aggregate power value associated with the second subset of beams; and
determining whether the first aggregate power value is greater than the second aggregate power value.

6. The method of claim 1, wherein beams generated from precoders in different subsets of are interleaved with each other in terms of pointing directions such that any two beams with adjacent pointing directions are generated from precoders belonging to different subsets.

7. The method of claim 3, wherein the precoders are oversampled a factor $2 \cdot k$, where $k=1$ or $k=2$, to form $2 \cdot k$ subsets such as the inner product of any precoders within each subset is minimized and/or such that all beams generated from the precoders within each subset are orthogonal to each other.

8. The method of claim 3, further comprising, before selecting the serving beams for the first UE and the second UE:
verifying that said first UE has reported at least one beam from the first subset and at least one beam from another one of the subsets; and
verifying that said second UE has reported at least one beam from the first subset and at least one beam from another one of the subsets.

9. The method of claim 3, further comprising:
requesting the first UE and the second UE to report beams generated from at least two of the plurality of subsets before transmitting the reference signals.

10. The method of claim 1, wherein the reference signals are transmitted over a radio propagation channel, the method further comprising:
verifying that angular spread of the radio propagation channel is smaller than a threshold value before selecting which beams to serve the first UE and the second UE.

11. The method of claim 1, wherein the beams are DFT beams.

12. The method of claim 1, wherein each of the reference signals is a channel state information reference signal, CSI-RS.

13. The method of claim 11, wherein the beams are reported in terms of CSI-RS Resource Indicators (CRIs).

14. The method of claim 1, wherein the beams sweep is performed in both azimuth and elevation.

15. The method of claim 1, wherein the beams are generated using analog beamforming.

16. The method of claim 1, further comprising:
transmitting data and/or control signalling towards one of the UEs using the selected serving beam for that UE.

17. The method of claim 1, further comprising:
receiving data from one of the first UE using the selected serving beam for the first UE.

18. A network node for beam selection, the network node comprising processing circuitry, the processing circuitry being configured to cause the network node to perform a process comprising:
performing a beam management procedure for at least a first user equipment (UE) and a second UE, wherein, during the beam management procedure, reference signals are transmitted in a beam sweep as performed in a set of beams comprising a plurality of subsets of beam including a first subset of beams and second subset of beams, wherein the first subset of beams is disjoint with the second subset of beams;
obtaining from the first UE first beam information, the first beam information identifying a first beam included in the first subset of beams and identifying a first beam included in the second subset of beams;
obtaining from the second UE second beam information, the second beam information identifying a second beam included in the first subset of beams and identifying a second beam included in the second subset of beams;
using the first beam information provided by the first UE and the second beam information provided by the second UE to select a subset of beams from the set of beams, wherein the selected subset of beams is the first subset of beams; and
as a result of selecting the first subset of beams:
  selecting, from the first subset of beams, a first serving beam to serve the first UE based on the first beam information provided by the first UE; and selecting, from the first subset of beams, a second serving beam to serve the second UE based on the second beam information provided by the second UE.

19. A non-transitory computer readable storage medium storing a computer program for beam selection, the computer program comprising computer code which, when run on processing circuitry of a network node, causes the network node to perform a process comprising:

performing a beam management procedure for at least a first user equipment (UE) and a second UE, wherein, during the beam management procedure, reference signals are transmitted in a beam sweep as performed in a set of beams comprising a plurality of subsets of beam including a first subset of beams and second subset of beams, wherein the first subset of beams is disjoint with the second subset of beams;

obtaining from the first UE first beam information, the first beam information identifying a first beam included in the first subset of beams and identifying a first beam included in the second subset of beams;

obtaining from the second UE second beam information, the second beam information identifying a second beam included in the first subset of beams and identifying a second beam included in the second subset of beams;

using the first beam information provided by the first UE and the second beam information provided by the second UE to select a subset of beams from the set of beams, wherein the selected subset of beams is the first subset of beams; and as a result of selecting the first subset of beams:

selecting, from the first subset of beams, a first serving beam to serve the first UE based on the first beam information provided by the first UE; and selecting, from the first subset of beams, a second serving beam to serve the second UE based on the second beam information provided by the second UE.

* * * * *